March 28, 1967     H. J. PHILLIPS     3,311,183

TRACTOR HAVING SADDLE GAS TANKS

Filed May 13, 1963     2 Sheets-Sheet 1

INVENTOR.
Harold J. Phillips
BY
Barnard, McGlynn & Reising
ATTORNEYS

March 28, 1967     H. J. PHILLIPS     3,311,183
TRACTOR HAVING SADDLE GAS TANKS
Filed May 13, 1963     2 Sheets-Sheet 2

INVENTOR.
Harold J. Phillips
BY
Barnard, McGlynn & Reising
ATTORNEYS

United States Patent Office 3,311,183
Patented Mar. 28, 1967

3,311,183
TRACTOR HAVING SADDLE GAS TANKS
Harold J. Phillips, Ferndale, Mich., assignor to Massey-Ferguson Incorporated, Detroit, Mich., a corporation of Maryland
Filed May 13, 1963, Ser. No. 279,789
7 Claims. (Cl. 180—1)

This invention relates to tractors and, in particular, to an improved saddle mounting for the fuel tanks of an agricultural tractor.

Agricultural tractors of the type to which the present invention pertains typically comprise a main longitudinally extending frame or chassis member including fixedly interrelated engine block and transmission housing extending rearwardly therefrom. The rear end of such housing includes a housing for a final drive mechanism including laterally extending drive axle means for driving the usual laterally spaced rear ground-engaging drive wheels of the tractor, while steerable front wheels are provided at the forward end of the main frame or chassis member. A tank for the fuel to be burned within the engine has been mounted directly over or immediately adjacent to the aforementioned block of the engine between the latter and the usual longitudinally extending hood construction extending rearwardly from the forward end of the tractor to a position adjacent the operator's position over a portion of the aforementioned transmission or final drive housing substantially between the rear driving wheels. Such a location of the fuel tank has in the past presented certain problems, the avoidance of which would be highly desirable for reasons which will become apparent hereinafter.

Thus, mounting of gas tanks immediately over or adjacent the engine block can present very definite fire hazards due to the extreme heat generated within the engine block, and certainly can present such hazards during filling of the tank with the engine quite hot. Furthermore, due to such location of the fuel tank relatively high above the engine block and beneath the usual hood construction, the tank filler spout is not accessible, relatively speaking, for fuel-filling purposes. In addition, due to the space required between the engine block and the overlying hood construction to receive a fuel tank of any acceptable capacity, it will be immediately apparent that the over-all profile of the tractor must be quite high which is disadvantageous in many environments in which the tractor must operate as within orchard areas or the like having low-hanging branches. Furthermore, a very considerable portion of the substantial weight of the fuel contained within a tank located as aforementioned is applied to the front axle and wheels of the tractor, which contributes in no way whatsoever to the tractive effort of the rear driving wheels thereof.

In view of the foregoing considerations, the present invention is directed to an improved tractor, and particularly an agricultural tractor, of the type including a longitudinally extending relatively rigid chassis member having a portion thereof disposed considerably rearwardly of the usual engine block and supporting drive axle means for a pair of laterally spaced rear drive wheels, and is particularly characterized by a pair of fuel tanks respectively mounted on opposite sides of the chassis member just forwardly of the aforementioned axle means and a considerable distance rearwardly of the engine block, whereby the fuel tanks are relatively isolated from the heat of the engine and are readily accessible for filling and without presenting any fire hazard even during filling, such location of the fuel tanks permitting reduction in the overall profile of the tractor for purposes aforementioned, providing the possibility of greater fuel capacity completely independent of tractor profile and, due to the close location of the fuel tanks to the rear drive axle means aforementioned, a major portion of the substantial weight of the fuel contained in the tanks is available at the rear axle and rear driving wheels to increase the tractive effort of the latter.

More specifically, the present invention contemplates an improved saddle-mounted fuel tank construction particularly for an agricultural tractor as aforementioned in which a pair of fuel tanks are respectively mounted on opposite sides of a longitudinally extending main frame or chassis member of the tractor immediately forwardly of the rear drive axle means thereof and substantially rearwardly of the tractor engine, which tanks are disposed in depending relation with respect to respective laterally extending end portions of a tractor operator's platform having a central portion thereof rigidly secured to such frame or chassis member, whereby the respective saddle tanks nest below the operator's platform to either side of such frame or chassis member.

More specifically in this regard, filler means including a cap are associated with an upper portion of one of the tanks while the usual fuel suction conduit and fuel level sensing mechanism including the usual float may depend from an upper portion of the other saddle tank, and conduit means extends beneath the frame or chassis member and interconnects lower portions of the respective tanks for flow of fuel therebetween, thereby permitting simultaneous filling of both tanks, sensing the level of fuel therein and drawing fuel therefrom.

In addition, the present invention is further characterized by the fact that one of the lateral extensions of the aforementioned platform extending over the upper portion of the one tank including the filler means aforementioned includes a pivotally mounted cover pivotally movable for access to the filler means, latch means also being provided for releasably latching the cover in a closed position over such filler means.

In order to facilitate an understanding of the invention, a preferred embodiment thereof will now be described with reference to the accompanying drawings in which.

Figure 1:
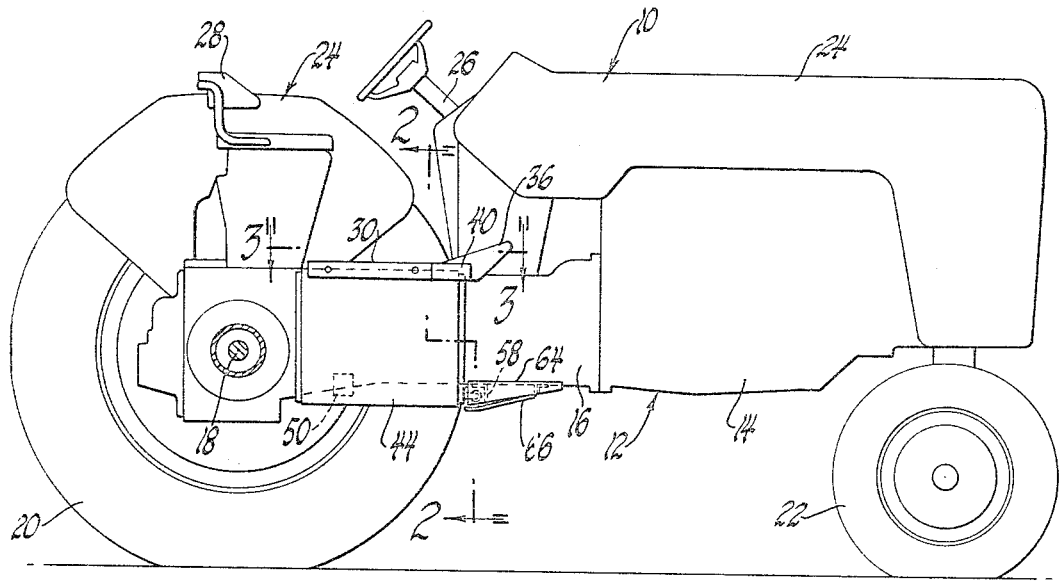
FIGURE 1 is a side elevation of an agricultural tractor illustrating a preferred embodiment of the invention.

Referring now to the drawings, the numeral 10 in FIGURE 1 generally indicates an agricultural tractor comprising a main frame or chassis member 12 including the engine block 14 rigidly secured in the usual manner to the forward end of a rearwardly longitudinally extending rigid housing member 16, as commonly employed to house the tractor transmission, the rearward portion of such housing including the usual conventional final drive mechanism including laterally projecting drive axle means 18 respectively drivingly connected to the laterally spaced rear drive wheels 20 of the tractor, only one of which being shown. The forward end of the aforedescribed main frame or chassis member is suitably supported by the steerable front wheels 22 as will be readily appreciated by those acquainted with this art. The usual hood construction 24 extends rearwardly over the engine block 14 and a forward portion of the housing member 16, and terminates at its rearward end adjacent an operator's station indicated generally at 24 and including the steering wheel mechanism 26 and a suitable operator's seat 28 mounted on and upstanding from the rearward portion of the housing member 16.

An operator's platform 30 extends laterally of the housing 16 just forwardly of the drive axle means 18 and considerably rearwardly of the engine block 14, and is disposed beneath the steering mechanism 26 forward of the operator's seat 28. A central portion of the platform is suitably fixedly secured to the upper wall of the housing 16 as by the means indicated at 32 in FIGURE 2, while the end portions thereof project laterally from and to either side of the housing 16 and terminate in downwardly projecting longitudinally extending mounting flanges 34. The platform 30 further includes a pair of laterally spaced upwardly and forwardly inclined foot rests 36 rigidly secured to and projecting from forward portions of the platform to either side of the housing 16 and the steering mechanism 26. A pair of upper step members 38 and 40, respectively, are located laterally outwardly of the respective foot rests 36 and are normally disposed in the plane of the platform 30, although the step member 38 is pivotal relative to the platform for selective access to a filler cap and opening associated with one of the fuel tanks as will be described further hereinafter.

Figure 2:
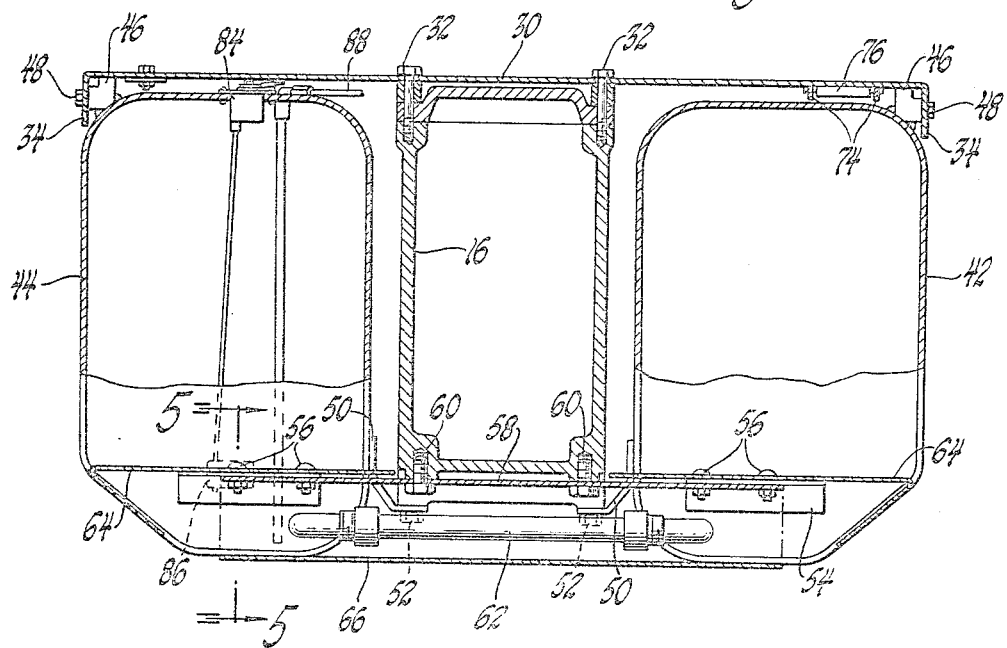
FIGURE 2 is an enlarged sectional view taken on line 2—2 of FIGURE 1.

A pair of fuel tanks 42 and 44, respectively, are mirror images of each other and otherwise substantially identical, and each has one or more mounting brackets 46 welded or otherwise suitably secured in longitudinally spaced relation along a laterally outboard upper corner thereof, such brackets being so dimensioned relative to the lateral extensions of the platform 30 and the mounting flanges 34 thereof as to nest therewith as illustrated particularly in FIGURE 2 with the upper wall portions of the respective tanks spaced immediately below the lateral extensions of the platform 30 to either side of the housing member 16. Fastening means as indicated at 48 rigidly secures the mounting brackets 46, and hence the tanks, to the mounting flanges 34 aforementioned. In addition, a lower portion of the laterally inboard side walls of the respective tanks have welded or otherwise secured thereto one end of the mounting brackets 50, the other ends of which are suitably secured as indicated at 52 to a lower wall of the housing member 16. Finally, the mounting brackets 54 respectively welded or otherwise suitably secured on a front wall of the respective tanks are suitably secured as by the fasteners 56 to an upper arm of a generally U-shaped laterally extending metal channel member 58, which arm is also suitably secured to the lower wall of the housing member 16 as by the fasteners 60. Thus, the respective tanks are fixedly mounted on opposite sides of the housing member 16 in depending relation with respect to the overhead lateral extensions of the platform 30.

At this juncture it may be noted that a conduit 62 extends beneath the housing member 16 and has its opposite ends connected to lower portions of the interiors of the respective fuel tanks 42 and 44 for flow of fuel therebetween. In this regard, the aforementioned channel member 58 extends generally about the upper, forward and lower portions of such conduit to form a guard therefor, while a pair of lower step plates 64 are suitably secured to the aforementioned mounting brackets 54 by the aforedescribed fasteners 56 and respectively extend laterally outwardly from the side walls of the housing member 16 in front of the respective tanks and beneath platform 30 and the upper steps 38 and 40 thereon. In addition, a lower panel member 66 extends laterally between bottom portions of the respective fuel tanks, and is suitably rigidly secured as indicated at 68 to forward ends of the respective lower step plates 64 and the lower arm of the aforedescribed channel member 58 and extends somewhat beneath the lower portion of conduit 62.

Figure 3:
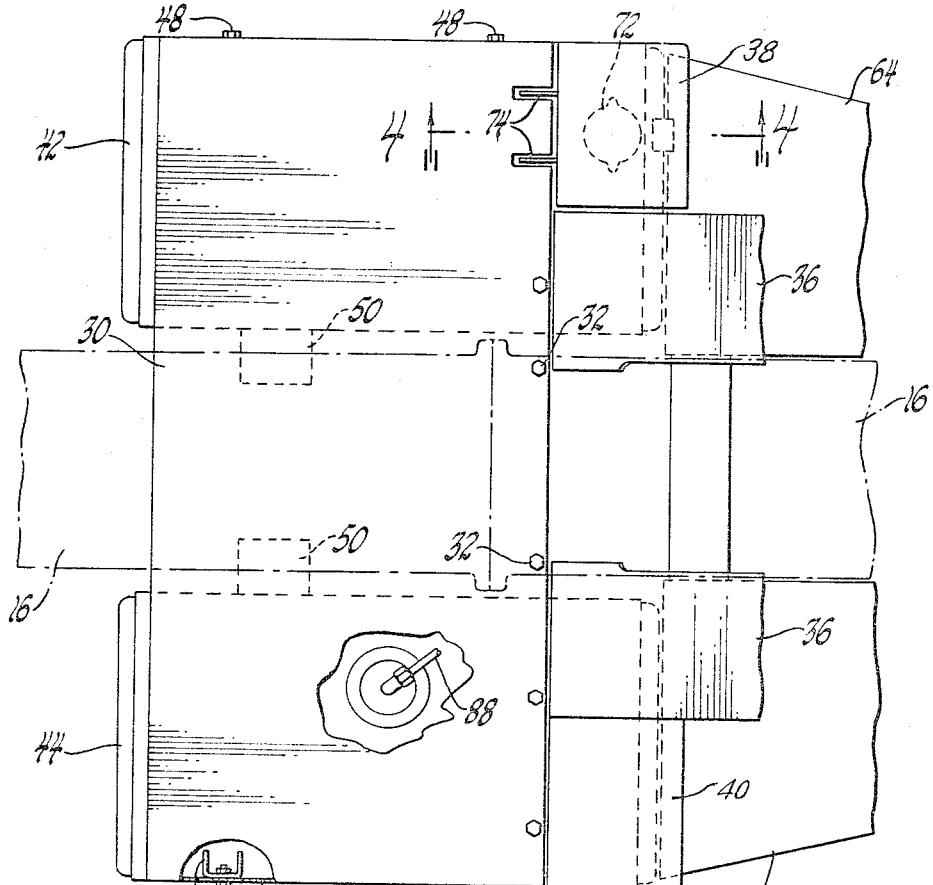
FIGURE 3 is an enlarged fragmentary sectional view taken on line 3—3 of FIGURE 1.
Figures 4, 5:
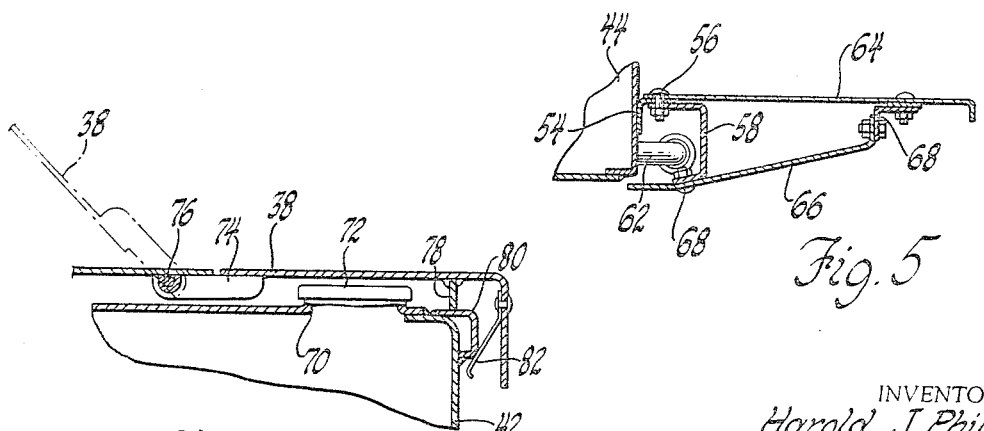
FIGURE 4 is an enlarged fragmentary sectional view taken on line 4—4 of FIGURE 3.
FIGURE 5 is a fragmentary sectional view taken on line 5—5 of FIGURE 2.

Referring now particularly to FIGURES 2 through 4, it may be seen that the upper wall of the one fuel tank 52 includes a filler spout 70 and removable cap 72 disposed immediately beneath the aforementioned step member 38. The step member 38 includes hinge arms 74 hingedly connected to an adjacent portion of the platform 30 as indicated at 76 for movement between a closed position thereof as illustrated in solid line in FIGURE 4 and an open position as indicated in dotted line in such figure for access to the filler cap and spout for the purpose of filling the tank 42 and, hence, the tank 44 through the conduit 62. A bracket 78 depending from the combined step and cover member 38 is engageable with a fixed detent member 80 fixed at the upper laterally outward corner of the tank 42 to stop the combined step and cover member in the position illustrated in solid line in FIGURE 4, a yieldable spring latch member 82 being secured to a depending flange of the combined step and cover member for releasable latching engagement with such detent to hold the member in the closed position thereof.

The other fuel tank 44 includes a conventional electrically operated fuel level sensing mechanism 84 suitably mounted in the upper wall thereof and including the usual swingable float arm mounting the float 86 within such tank. In addition, a fuel line 88 is suitably connected in such upper wall of such tank and includes a pipe depending therefrom into the bottom thereof in the usual manner for supply of fuel to the carburetor of the engine. Naturally, due to the conduit 62 interconnecting the respective fuel tanks, fuel is drawn from both through the fuel line aforedescribed and the level in both is sensed by the sensing mechanism aforedescribed. The usual vent will be provided in an upper wall of one of the fuel tanks for obvious reasons.

In view of the foregoing description, it will now be seen that the respective fuel tanks 42 and 44 are saddle-mounted to either side of the housing member 16 in depending relation with the lateral extensions of the platform 30 just forwardly of the axle means 18 and a considerable distance rearwardly of the engine block 14. Furthermore, such tanks are protected from inadvertent damage under normal operating conditions by the lateral extensions of the platform and the guard construction at the forward ends thereof comprising the respective lower step members 64, channel member 58 and lower panel member 66 aforedescribed. Thus, the two fuel tanks provide more than adequate fuel capacity for the tractor while permitting a low over-all profile thereof for reasons aforementioned. Furthermore, merely by lifting the combined step and cover member 38 which, it may be noted, is disposed at a relatively low level for ready access to the filler spout 70, the tanks may be readily filled and at a position remote from the engine as to completely eliminate fire hazards. Furthermore, the substantial weight of the fuel contained in the tanks is disposed quite close, relatively speaking, to the rear drive axle means 18 so as to increase the tractive effort of the rear driving wheels 20.

The embodiments of the invention in which an exclusive property or privilege is claimed are defined as follows:

1. In a tractor of the type comprising a longitudinally extending rigid housing member enclosing a drive mechanism and including a rearward portion supporting an operator's station and drive axle means below said station and extending laterally from said housing member between a pair of drive wheels which are disposed on opposite sides of said housing member, the improvement comprising a pair of fuel tanks respectively fixedly mounted directly between and substantially within the peripheral confines of said drive wheels on opposite sides of said housing member immediately forwardly adjacent said axle means and beneath said operator's station.

2. In a tractor of the type set forth in claim 1 wherein said operator's station includes a platform fixedly secured to said housing member and extending laterally from each side thereof, each of said fuel tanks depending beneath the respective extensions of said platform.

3. In a tractor of the type including a longitudinally extending rigid housing member having a forward portion thereof rigidly secured to an engine block and a rearward portion thereof supporting drive axle means extending between a pair of laterally spaced rear drive wheels; the improvement comprising an operator's platform fixedly secured to an upper portion of said housing member and extending laterally to each side thereof forwardly of said axle means, a pair of fuel tanks respectively mounted on opposite sides of said housing member and depending beneath the respective extensions of said platform, conduit means interconnecting lower portions of said respective tanks for flow of fuel therebetween, and filler means including a cap in an upper portion of one of said tanks for filling both of said tanks, one of the extensions of said platform over said upper portion of said one of said tanks including means defining a movable cover for said filler means for access to the latter, said cover being vertically spaced from said cap.

4. In a tractor of the type including a longitudinally extending rigid housing member having a forward portion thereof rigidly secured to an engine block and a rearward portion thereof supporting drive axle means extending between a pair of laterally spaced rear drive wheels; the improvement comprising an operator's platform fixedly secured to an upper portion of said housing member and extending laterally to each side thereof forwardly of said axle means, a pair of fuel tanks respectively mounted on opposite sides of said housing member and depending beneath the respective extensions of said platform, conduit means interconnecting lower portions of said respective tanks for flow of fuel therebetween, filler means including a cap in an upper portion of one of said tanks for filling both of said tanks, one of the extensions of said platform over said upper portion of said one of said tanks including means defining a movable cover for said filler means for access to the latter, said cover being vertically spaced from said cap, and latch means for releasably latching said cover in a closed position over said filler means.

5. In a tractor of the type including a longitudinally extending rigid housing member having a forward portion thereof rigidly secured to an engine block and a rearward portion thereof supporting drive axle means extending between a pair of laterally spaced rear drive wheels; the improvement comprising an operator's platform fixedly secured to an upper portion of said housing member and extending laterally to each side thereof forwardly of said axle means, a pair of fuel tanks respectively mounted on opposite sides of said housing member and depending beneath the respective extensions of said platform, and filler means including a cap in an upper portion of one of said tanks for filling said tank, one of the extensions of said platform over said upper portion of said one of said tanks including means defining a movable cover for said filler means for access to the latter, said cover being vertically spaced from said cap.

6. In an agricultural tractor of the type including a transmission housing having a forward portion thereof rigidly secured to an engine block and a rearward portion thereof supporting drive axle means extending between a pair of laterally spaced rear drive wheels; the improvement comprising an operator's platform fixedly secured to an upper portion of said housing and extending laterally to each side thereof forwardly of said axle means, a pair of fuel tanks respectively mounted on opposite sides of said housing and depending beneath the respective extensions of said platform, conduit means extending beneath said housing and interconnecting the lower portions of said respective tanks for flow of fuel therebetween, filler means including a cap in an upper portion of one of said tanks for filling both of said tanks, one of the extensions of said platform over said upper portion of said one of said tanks including means defining a movable cover for said filler means for access to the latter, said cover being vertically spaced from said cap, and releasable latch means for releasably latching said cover in a closed position over said filler means.

7. The tractor according to claim 6 further comprising means communicating with the other of said tanks for drawing fuel from both of said tanks.

References Cited by the Examiner

UNITED STATES PATENTS

| | | | |
|---|---|---|---|
| 1,797,873 | 3/1931 | McManuus | 280—5 |
| 2,035,895 | 3/1936 | Kelly. | |
| 2,276,963 | 3/1942 | Griffin | 280—5 |
| 2,445,275 | 7/1948 | Lintern et al. | 280—5 |
| 2,530,819 | 11/1950 | Hamlin. | |
| 2,743,934 | 5/1956 | Chambers et al. | 280—5 |
| 2,797,957 | 7/1957 | North | 180—1 X |
| 2,808,892 | 10/1957 | Walker | 280—5 X |
| 2,946,598 | 7/1960 | Foster | 280—5 |
| 3,177,969 | 4/1965 | May et al. | 280—5 X |

FOREIGN PATENTS 186,986  10/1956  Australia.

A. HARRY LEVY, *Primary Examiner.*